J. T. UNDERWOOD.
BURNER FOR KILNS.
APPLICATION FILED NOV. 3, 1913.
1,105,723.
Patented Aug. 4, 1914.
4 SHEETS—SHEET 2.
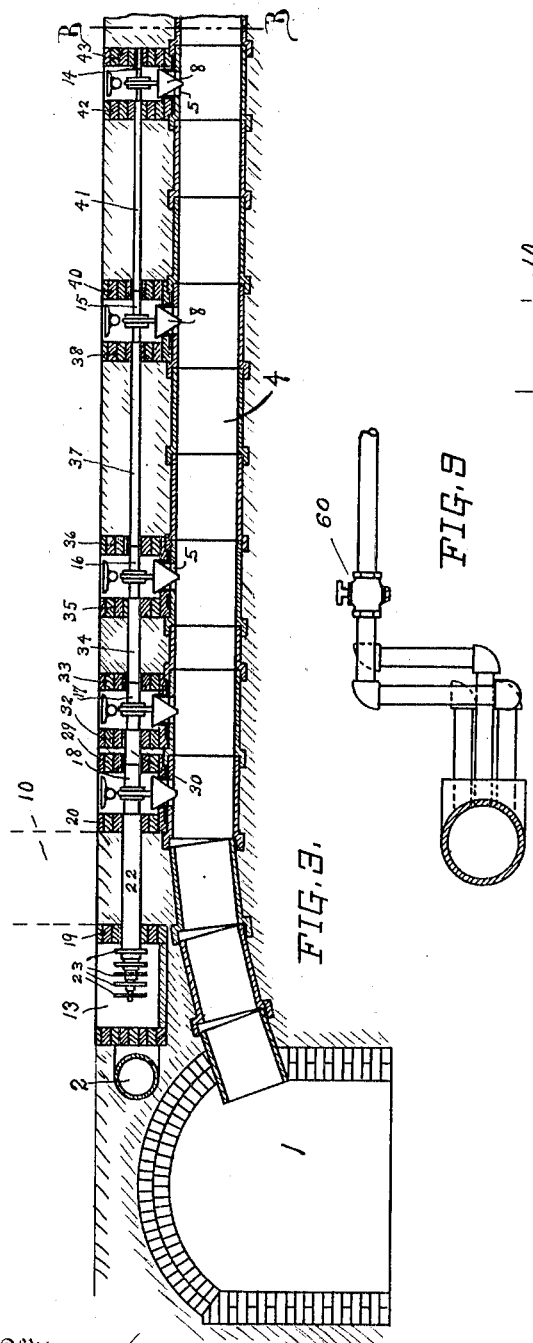
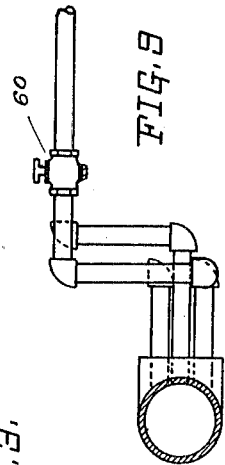
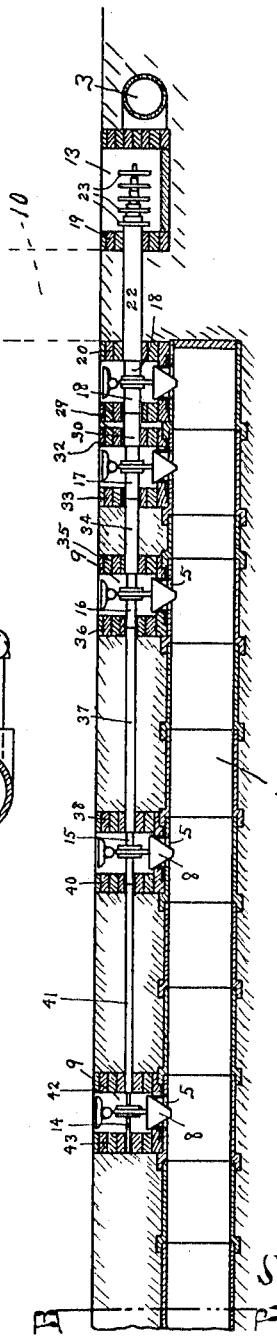

J. T. UNDERWOOD.
BURNER FOR KILNS.
APPLICATION FILED NOV. 3, 1913.

1,105,723.

Patented Aug. 4, 1914.

4 SHEETS—SHEET 1.

Inventor
J. T. Underwood.

J. T. UNDERWOOD.
BURNER FOR KILNS.
APPLICATION FILED NOV. 3, 1913.

1,105,723.

Patented Aug. 4, 1914.
4 SHEETS—SHEET 3.

Witnesses
Hugo W. Kreinbring
L. M. Spencer

Inventor
J. T. Underwood
By Edward N. Pagelsen
Attorney

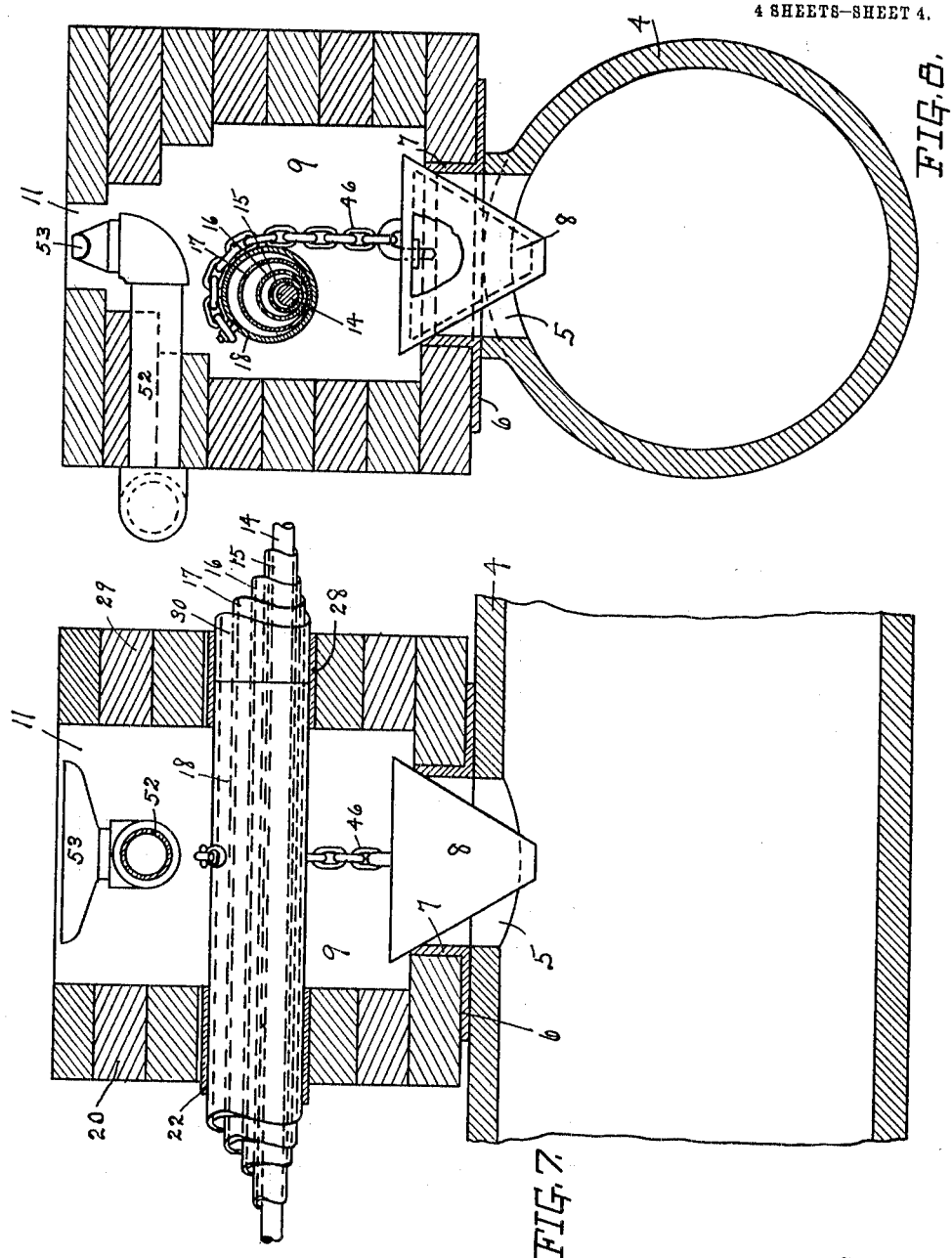

UNITED STATES PATENT OFFICE.

JOHN T. UNDERWOOD, OF DETROIT, MICHIGAN, ASSIGNOR TO UNDERWOOD ENGINEERING COMPANY, OF DETROIT, MICHIGAN, A CORPORATION OF MICHIGAN.

BURNER FOR KILNS.

1,105,723.  Specification of Letters Patent.  Patented Aug. 4, 1914.

Application filed November 3, 1913. Serial No. 798,865.

*To all whom it may concern:*

Be it known that I, JOHN T. UNDERWOOD, a citizen of the United States, and a resident of Detroit, in the county of Wayne and State of Michigan, have invented a new and useful Burner for Kilns, of which the following is a specification.

This invention relates to burners adapted for use with kilns employed for the burning of brick, terra cotta and other earthen products; and its object is to provide a construction which can be accurately and easily controlled; which shall be reasonably certain in its operation; and which can be constructed at comparatively low cost.

This invention consists in combination with gas and air mains, preferably parallel to each other, through which the fluids flow under pressure, of a series of gas conduits or passages extending parallel to each other beneath the floor of the kiln, and provided with valve seats in their upper sides, of a series of valves each independently operable by one or another of a system of telescoping shafts, of a series of pipes extending from the air main parallel to the gas conduits, and having nozzles at their ends for the discharge of air upwardly through openings in the floor of the kiln.

Figure 1:
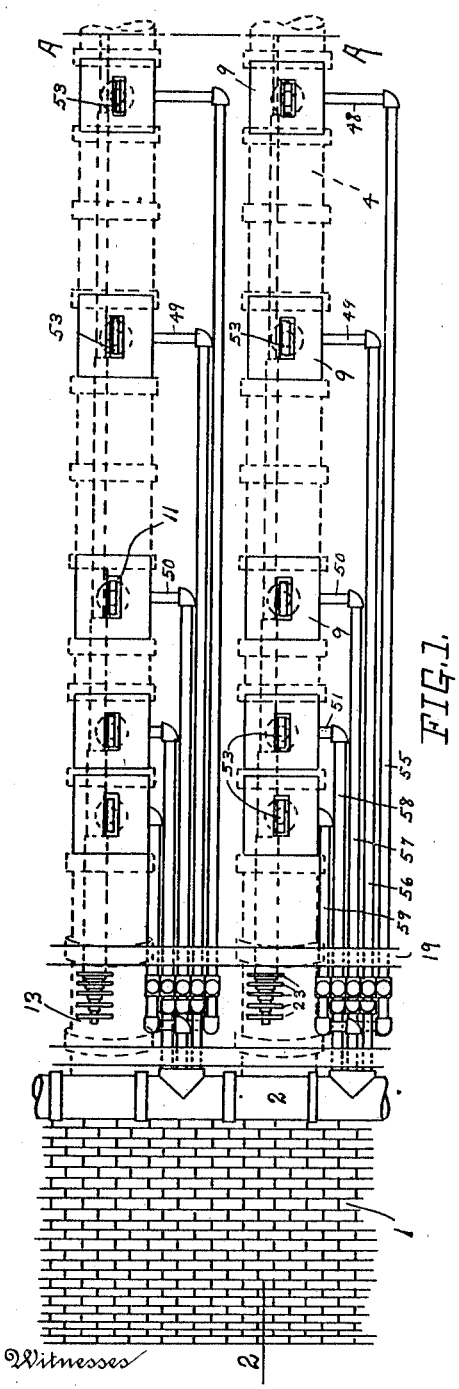
Figure 2:
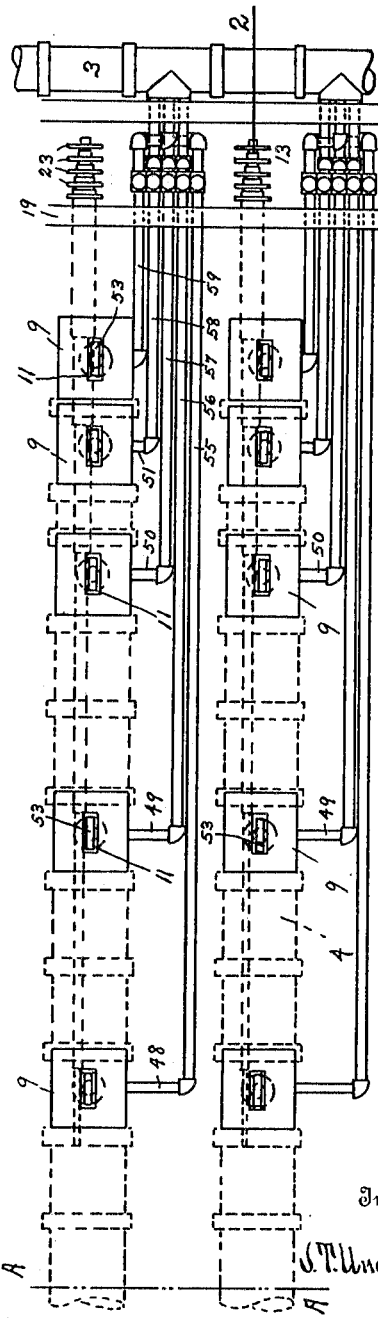
Figure 5:
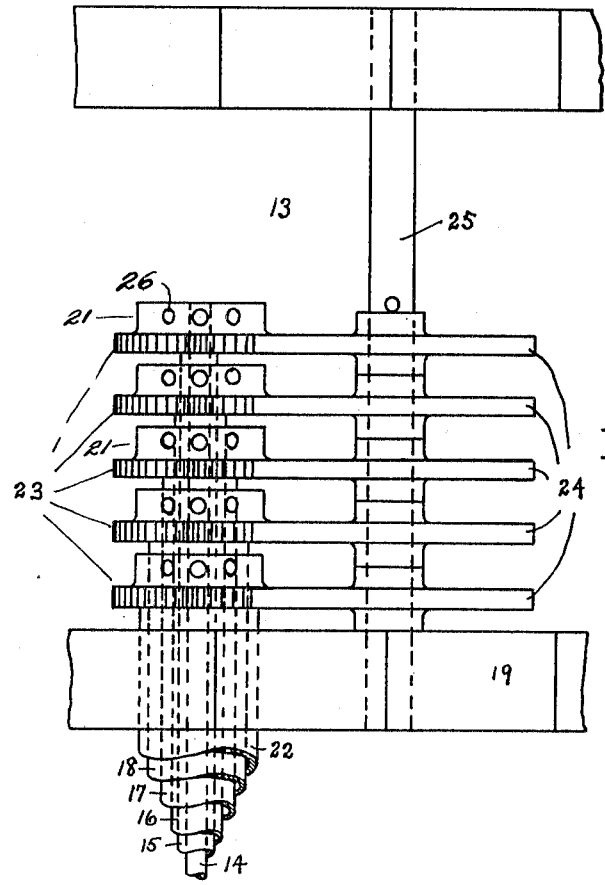
Figure 6:
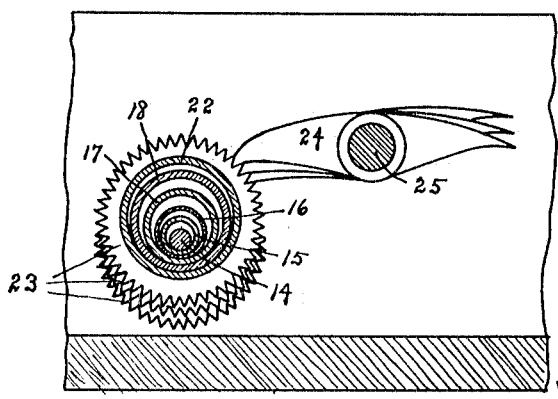

In the accompanying drawings Figures 1 and 2 are together a plan of a section of kiln floor, the two to be considered as being joined along the line A—A. Figs. 3 and 4 are longitudinal vertical sections along the lines 2—2 of Figs. 1 and 2, and constitute a single view and join along the lines B—B. Fig. 5 is a plan of the operating mechanism of the gas valves. Fig. 6 is a detail of the same. Fig. 7 is a longitudinal section and Fig. 8 a transverse section of a valve and its connections. Fig. 9 is a view showing the connection of the air pipes to the air main.

Similar reference characters refer to like parts throughout the several views.

In the burning of brick, terra cotta tiles and similar materials, it has been found preferable to employ producer gas because of the ease of control and the low cost. The present construction combines means for regulating the flow of this producer gas upwardly through openings in the floor of the kiln, mixed with air under pressure and also under control, so that the proper amount of air and of gas can be delivered at any desired point.

In the drawings, 1 represents a main or tunnel through which the gas may be forced under pressure, and 2 and 3 are the mains for the air, also under pressure. These air mains and the gas tunnel will preferably extend parallel to the front and rear sides of the kiln. Extending transversely of the kiln from the tunnel 1 are a series of conduits 4 for the gas, preferably constructed of lengths of terra cotta pipe and in part formed with openings 5 as shown in Figs. 7 and 8. Resting on circular flanges formed on the proper sections of this conduit are iron plates 6 having cylindrical flanges 7 in which the mushroom valves 8 may fit. Extending upwardly above these flanged plates are the valve chambers 9. It has been found desirable to have the openings 11 where the gas may be burned and therefore, the valve chambers 9, nearer together adjacent the walls 10 of the kiln (indicated by dotted lines) than at the middle of the kiln.

Chambers 13 are built outside of the walls 10 of the kiln and contain the operating mechanism for these mushroom valves 8. This mechanism consists of a series of telescoping shafts, the inside shaft 14 being preferably solid and the other shafts 15, 16, 17 and 18 being of ordinary pipe. Mounted in the wall 19 of the chamber 13, as shown in Fig. 3, and in the adjacent wall 20 of the first valve chamber 9, is a pipe 22 through which the shaft 18 extends. On the outer ends of the shafts are the toothed wheels 23 (see Figs. 5 and 6), preferably all of the same diameter, with which the pawls 24 engage, which pawls are carried by the shaft 25. The hubs 21 of the wheels 23 may have holes 26 into which the end of a bar may be inserted, so that the shafts may be turned as desired, and held in such position by the pawls 24.

Referring to Figs. 3 and 7, it will be seen that the pipe 22 is mounted in the inner wall 19 of the chamber 13 and in the outer wall 20 of the first chamber 9. Within this pipe the hollow shaft 18 is freely revoluble, and has its inner end journaled in the thimble 28, mounted in the wall 29. A pipe 30 of the diameter of the shaft 18 is also mounted in this thimble 28, and extends through the wall 32 of the next chamber 9. The shaft 17 is revolubly mounted in this pipe 30 and extends across this second chamber 9 and its inner end is journaled in a proper thimble in the wall 33. In a similar manner, the shaft 16 extends through the shaft 17 and the pipe 34, mounted in the walls 33 and 35, and into a thimble in the wall 36, its inner end engaging the end of the pipe 37 mounted in the walls 36 and 38. The shaft 15 extends from the chamber 13 through the shaft 16 and pipe 37 into the fourth valve chamber, and the shaft 14 extends through the shaft 15 and the pipe 41 into the fifth valve chamber, the pipe 37 being mounted in the walls 36 and 38, while the pipe 41 is mounted in the walls 40 and 42. The spaces between the valve chambers may be filled with earth and the pipes 30, 34, 37 and 41 prevent contact of the earth and the shafts. This construction is rough but is sufficiently exact and is moreover very strong and durable, as well as extremely cheap. On the inner end of each shaft but the largest shaft 18, is secured a chain 46, whose lower end is connected to the adjacent valve 8. It will therefore be seen that the valves 8 can be raised and lowered independently of each other. The weight of these valves may be comparatively light so that any one of the shafts may be turned without turning the adjacent shafts, or they may be prevented from turning by inserting bars into the holes in the hubs 26. The reference characters of Fig. 4 is the same as those of Fig. 3, as the constructions are substantially duplicates. Extending into each valve chamber is a pipe 48, 49, 50, 51 or 52 having a flat upwardly directed nozzle 53 at its inner end, so positioned that the blast of air issuing from the nozzle will be directed upwardly through the opening 11 of the valve chamber, where it will mix with the gas flowing around the valve 8 from the passage 5. These transverse pipes connect to the pipes 55, 56, 57, 58 and 59, respectively, which connect to the air mains 2 and 3, each being preferably provided with a simple valve or stop-cock 60 (see Fig. 9) to control the flow of air, as shown in Figs. 1 and 2. Because of the pressure of the air and gas, pressure will exist in the kiln during the burning, and any crack which may develop in the walls of the kiln will be substantially without effect on the adjacent bricks as the heat within the kiln is practically the same throughout because of the means for regulating the burning of the gas. This is of peculiar advantage over the ordinary draft kiln where a crack in the wall results in chilled and partially burned brick adjacent such opening. Because of this ability to regulate the amount of air and gas at every part of the furnace, the charge of brick may be burned evenly and completely at the lowest fuel cost.

Many changes in this construction may be made by those skilled in the art of furnaces and kilns without departing from the spirit of my invention as set forth in the claims. While the burners and passages are particularly adapted for brick kilns, they may be used with kilns for any other wares, and for various types of furnaces.

I claim:

1. The combination of a gas and an air main, a conduit leading from the gas main and having a series of openings in its upper side, valve seats mounted on the conduit around the openings, a valve for each seat, a valve chamber surrounding each valve and having an opening in its upper end, means to operate each valve, and an air pipe extending into each valve chamber and having an upwardly directed nozzle to discharge air through the opening in the top of the valve chamber.

2. The combination of a gas and an air main, a conduit leading from the gas main and having a series of openings in its upper side, valve seats mounted on the conduit around the openings, a valve for each seat, a valve chamber surrounding each valve seat and having an opening in its upper end, telescoping shafts extending parallel to said conduit, one for each chamber, means to actuate each shaft independent of the other, a valve in each valve chamber connected to the end of one of the shafts, and means for conducting air from the air main into each valve chamber.

3. The combination of a gas and an air main below the surface of the floor of a kiln, a conduit extending below the floor from the gas main and having a series of openings in its upper side, a valve to close each opening, a valve chamber surrounding each valve and having an opening in its upper end at the level of the floor, telescoping shafts extending through the walls of said chambers, means connecting the shafts to the valves so that any desired valve may be moved from its seat, a pipe extending into each valve chamber from the air main, and an upwardly directed nozzle at the inner end of each pipe to discharge air through the opening in the top of the valve chamber.

4. The combination of a gas and an air main, a conduit leading from the gas main and having a series of openings, tapering plug-valves closing said openings, a valve chamber constructed around each valve and having a discharge opening in its upper end, a series of telescoping shafts extending through the walls of said chambers, a chain mounted on the end of each shaft and connecting to the adjacent valve, means to turn each shaft and hold it in predetermined position, a series of pipes, one for each valve chamber, extending from the air main into said valve chambers, an upwardly directed nozzle at the end of each pipe within the valve chamber to discharge air through the opening in the top of the valve chamber, and means to control the flow of air.

5. The combination of a gas main, a conduit extending therefrom under the floor of a kiln and consisting of lengths of terra cotta pipes, a portion of said lengths having openings in their upper sides, valve chambers extending from the conduit to the surface of the floor and having openings to permit gas to flow into the kiln, a series of shafts extending through the walls of the valve chambers, one for each opening in the conduit, a valve for each opening, a flexible connector for each shaft and valve, and means to turn each shaft independently of the others so that the valve connected thereto may be raised.

6. The combination of a gas main, a conduit extending therefrom under the floor of a kiln and consisting of lengths of terra cotta pipes, a portion of said lengths having openings in their upper sides, valve chambers extending from the conduit to the surface of the floor and having openings to permit gas to flow into the kiln, a series of shafts extending through the walls of the valve chambers, one for each opening in the conduit, a valve for each opening, a flexible connector for each shaft and valve, and means to turn each shaft independently of the others so that the valve connected thereto may be raised, said means consisting of a ratchet wheel having holes in its hub to receive a lever whereby the shaft may be turned and a pawl to prevent the seating of the valve until it is released.

7. The combination of a gas main, a conduit extending therefrom under the floor of a kiln and consisting of terra cotta tubes having openings at intervals in the top, a valve chamber for each opening extending from the conduit to the surface of the floor and having an opening to permit gas to flow into the kiln, a series of telescoping shafts extending through the walls of the valve chambers, one for each chamber, a valve for each opening, a flexible connector for each shaft and valve, and means to turn each shaft independently of the others so that the valve connected thereto may be raised.

8. The combination of a gas conduit having an opening therein, a valve seat mounted on the conduit around the opening, a valve for the seat, a valve chamber surrounding the valve and having an opening therein, means to operate the valve, and an air pipe extending into the valve chamber and having a nozzle directed to discharge air through the opening in the valve chamber, and means to control the flow of air.

9. The combination of a gas conduit having a plurality of openings therein, a plurality of valve seats mounted on the conduit one around each opening, a valve for each seat, a valve chamber surrounding each valve and having an opening therein, means to operate the valves, an air pipe extending into each valve chamber and having a nozzle directed for discharging air through the opening of the valve chamber, and means to control the flow of air.

In testimony whereof I have signed this specification in the presence of two subscribing witnesses.

JOHN T. UNDERWOOD.

Witnesses:
 EDWARD N. PAGELSEN,
 HUGO W. KREINBRING.

---

Copies of this patent may be obtained for five cents each, by addressing the "Commissioner of Patents, Washington, D. C."